United States Patent [19]
Cavailles

[11] Patent Number: 5,229,622
[45] Date of Patent: Jul. 20, 1993

[54] INTEGRATED SEMICONDUCTOR OPTOELECTRONIC SWITCH

[75] Inventor: Jean-Aristide Cavailles, Saint-Mande, France

[73] Assignee: U.S. Philips Corp., New York, N.Y.

[21] Appl. No.: 814,058

[22] Filed: Oct. 15, 1991

Related U.S. Application Data

[63] Continuation of Ser. No. 535,100, Jun. 8, 1990, abandoned.

[30] Foreign Application Priority Data

Jun. 9, 1989 [FR] France ............... 89 07660

[51] Int. Cl.$^5$ ............... H01L 27/14; H01L 31/00
[52] U.S. Cl. ........................... 257/21; 257/52; 257/184; 257/431; 372/12; 372/45
[58] Field of Search ............ 357/25, 30 B, 30 E, 357/30 D; 350/353, 354; 257/21, 53, 184, 431; 372/12, 43, 44, 45

[56] References Cited

U.S. PATENT DOCUMENTS 3,953,810  4/1976  Veilex ..................... 332/7.51
4,093,344  7/1978  Damen et al. ........... 350/147
4,597,638  7/1986  Chemla et al. .......... 350/354

FOREIGN PATENT DOCUMENTS 0030821  2/1988  Japan .

Primary Examiner—Rolf Hille
Assistant Examiner—David Ostrowski
Attorney, Agent, or Firm—Steven R. Biren

[57] ABSTRACT

An integrated semiconductor device which forms an optoelectronic switch and includes: a directional coupler structure in which one of the guides receives the input light power and the other guide is formed by multiple quantum wells, which structure is so dimensioned that in the zero-bias state the switch is in the crossover state, and switching control means.

The structure includes layers which form at least one PIN structure in which the waveguide consisting of multiple quantum wells constitutes an intrinsic region I, and the control means include means for reverse-biasing of the PIN structure which supplies the negative feedback so that switching from one state to the other is initiated by a change in the level of the luminous power injected into the input waveguide.

27 Claims, 9 Drawing Sheets

INTEGRATED SEMICONDUCTOR OPTOELECTRONIC SWITCH

This is a continuation of application Ser. No. 07/535,100, filed Jun. 8, 1990 now abandoned.

FIELD OF THE INVENTION

The invention relates to an integrated semiconductor device which forms an optoelectronic switch and comprises:

on the one hand, a directional coupler structure in which one of the guides receives the input light power and the other guide is formed by multiple quantum wells, which structure is so dimensioned that in the zero-bias state the switch is in the crossover state, on the other hand, switching control means.

The invention also relates to integrated semiconductor devices comprising switching matrices realised by means of such switches.

The invention finds its application in the field of, for example, telecommunications.

An optoelectronic coupler with a vertical structure is known in the present art from the publication entitled "Quantum Well Waveguide Coupler" by Dietrich W. Langer & Marech Chmielowski in "Superlattices, Microstructures and Micro-devices", which publication contains the papers presented at the "4$^{th}$ International Conference on Superlattices, Microstructures and Micro-devices, TRIESTE, ITALY, Aug. 8-12, 1988".

The known switch comprises a GaAs substrate of the n+ type on whose rear surface is provided an electrical contact; a lower confinement layer of $Ga_{0.2}Al_{0.8}As$ with a refractive index 3.136; a first light waveguide formed by alternating layers of GaAs/GaAlAs for forming a structure of multiple quantum wells (MQW); a separating layer of $Ga_{0.57}Al_{0.43}As$ with a refractive index 3.355; a second light waveguide formed from $Ga_{0.65}Al_{0.35}As$ with a refractive index 3.38; and an upper confinement layer of $Ga_{0.2}Al_{0.8}As$ with a refractive index 3.136 covered by a second electrode for applying a voltage which controls the switching between the two waveguides.

The second waveguide, i.e. the one which is in the upper part of the device farthest away from the n+-type substrate, is thus made up of ternary material disposed between two layers also of ternary material but of a lower refractive index, while the first waveguide is the one which consists of a structure of multiple quantum wells (MQW).

This known device has a length calculated as a function of the refractive indices of the materials and the thickness of the separating layer so that, if no voltage is applied between the two electrodes, all light put into the second waveguide of ternary composition passes into the first waveguide having the MQW structure and issues at the end of this latter waveguide. Conversely, when a voltage is applied between the electrodes, the refractive index of the MQW structure changes and the light remains confined in the input waveguide, i.e. the second waveguide of ternary composition.

The advantage obtained through the use of an MQW structure for constituting one of the waveguides is that the change in the refractive index as a function of the applied voltage is much greater than in the case of a waveguide of normal ternary composition owing to the specific quantum characteristics of the material. To obtain switching, therefore, it is possible to use devices of a smaller coupling length and at the same time to apply less strong voltages. The devices obtained thus offer an increased compatibility with integrated circuits since their surfaces are smaller and their power consumptions lower.

This known device, nevertheless, has for its main disadvantage the fact that it relies on an external command for controlling the switching.

Another known device according to the present art is a PIN diode whose intrinsic region is formed by a structure of multiple quantum wells (MQW). Such a diode is described in the publication entitled "The Quantum Well Self Electrooptic Effect Device" by David A. B. Miller et al. in "IEEE Journal of Quantum Electronics, vol. QE-21, no. 9, September 1985".

This document describes a PIN diode consisting of, in that order, an n-type GaAs substrate; an n-type GaAs layer for forming an n-type contact; a superlattice (SL) region consisting of 50 alternating layers of GaAs (28.5 Å) and GaAlAs (68.5 Å), of which the 20 first layers are n-doped; a structure of multiple quantum wells (MQW) constituting the intrinsic region of the diode and composed of 50 alternating layers of GaAs (95 Å) and GaAlAs (98 Å), of which layers the 20 last ones are p-doped and covered by a gold ring for forming a p-type electrode.

All these layers form a mesa embedded in an epoxy resin. A conductor wire constitutes the contact with the gold ring and the assembly is covered by a substrate of sapphire. The device is given the abbreviated name QWSEED (Quantum Well Self Electrooptic Device).

This device receives on the one hand a radiation perpendicular to the layers and passing through the centre of the gold ring, and on the other hand a voltage which may be applied between the electrodes by way of forward or reverse bias.

This publication discloses that when radiation is sent perpendicularly through the MQW structure, at a bias voltage V=O, the device shows two absorption peaks as a function of the photon energy eV proportional to $1/\lambda$, in which $\lambda$ is the wavelength of the radiation. First a peak of high value for a high wavelength or a lower photon energy corresponding to the so-called "heavy hole" exciton, followed by a lower peak for a lower wavelength or higher photon energy, corresponding to the so-called "light hole" exciton.

When a reverse bias voltage is applied to the PIN diode of this construction, these peaks are shifted in the direction of greater wavelengths or lower photon energy levels.

If an intermediate wavelength is chosen for the radiation applied to the photodiode, and if the value of the reverse bias is made to vary, an absorption is obtained in the MQW structure which first increases when the bias voltage increases, passes through a maximum, and then decreases when the value of this bias voltage continues to increase.

Owing to the fact that the voltage across the system influences the absorption of light by the MQW structure, when the light beam is injected perpendicularly to the layers, it therefore influences the photocurrent. This shows that there is a negative photoconductance region as a function of the voltage, thus resulting in feedback.

This document discloses that the phenomenon of negative conductance leads to various possibilities: on the one hand hysteresis connected with this phenomenon makes it possible to obtain a bistable system by way of positive feedback, and thus a memory effect; on the other hand the system can also function as an oscillator, and, if a sinusoidal bias voltage is applied between the electrodes, the light is power modulated at the exit of the PIN diode.

Finally, the behavior is different in the case of negative feedback: a self-linearized modulation is then obtained.

The present invention has for its main object to provide an optoelectronic switch which is provided with self-switching means and which can more particularly be optically controlled.

SUMMARY OF THE INVENTION

According to the invention, this object is achieved by means of a device as described above and further characterized in that:

the structure comprises layers which form at least one PIN structure in which the waveguide consisting of multiple quantum wells constitutes an intrinsic region I, and the control means include means for reverse-biasing of the PIN structure which supplies the feedback in order to achieve that the switching from one state to the other is initiated by a change in the level of the luminous power injected into the input waveguide.

The advantage of the device according to the invention is that the switching control depends exclusively on the luminous power input and that the electric circuit for biasing the PIN structure is much simpler than a classic electric switching control circuit with the same properties.

BRIEF DESCRIPTION OF THE DRAWING

The invention will now be described in more detail with reference to the annexed drawing, in which.

DESCRIPTION OF THE PREFERRED EMBODIMENTS

Figure 1A:
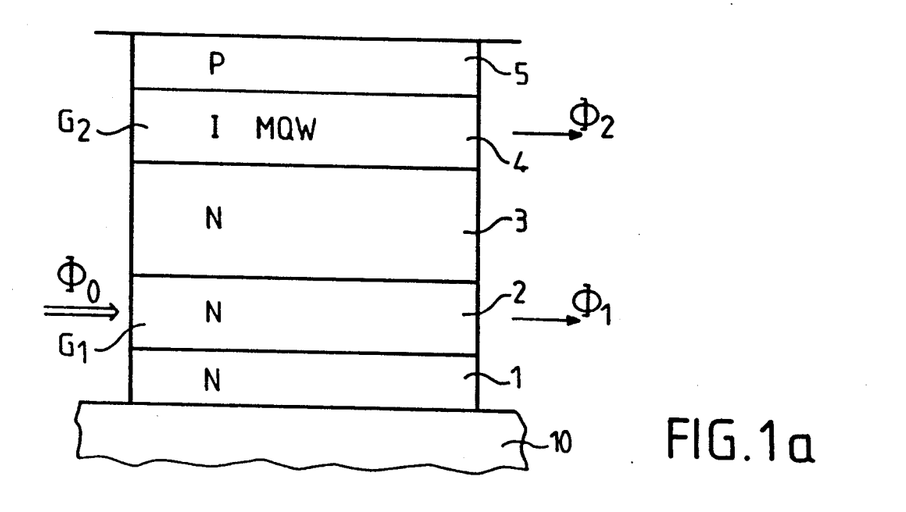
FIG. 1a represents a vertical structure for forming an optoelectronic switch according to the invention.

To make an integrated optoelectronic switch, as is shown in FIG. 1a, a PIN structure is thus realized with multiple quantum wells, provided with a biasing device supplying feedback, by means of n-type layers directly disposed on a substrate 10, which is possibly chosen to be semi-insulating, surmounted by an intrinsic region I consisting of multiple quantum wells (MQW), and by a p-type layer.

Subsequently, this PIN structure is adapted for realizing an optoelectronic switch with vertical structure. This switch is, for example, formed on the basis of the substrate 10 by a first confinement layer 1, a first light waveguide $G_1$ of a material 2, a separating layer 3, a second light waveguide $G_2$ of a material 4, and a second confinement layer.

For a successful adaptation of the PIN structure to act as an optoelectronic switch, the first confinement layer 1 is of the n-type, the material 2 forming the first light waveguide $G_1$ is of the n-type, the separating layer 3 is of the n-type, the material 4 forming the second light waveguide $G_2$ coincides with the intrinsic region I consisting of multiple quantum wells, and the second confinement layer is of the p-type. The p-type layer 5 and the n-type layer 1 are provided with contacts, P and N, respectively, realised in a way known to those skilled in the art by means of ohmic layers.

The luminous input power $\phi_0$ is injected into the n-type waveguide $G_1$. Between the contacts N and P is provided an electric circuit which provides a reverse bias voltage to the contacts of the PIN diode according to the invention. Such circuits are represented by way of example in the FIGS. 2a, 3a, 4a.

In an embodiment of the invention, the first confinement layer 1 is made of a ternary III-V material such as, for example, GaAlAs, as is the material 2 of the first waveguide $G_1$, the separating layer 3 and the second confinement layer 5. In these layers, the aluminum (Al) concentration is then chosen in such a way that the refractive index of the confinement layers and the separating layer is lower than that of the light waveguides. This effect is obtained through choosing the aluminum (Al) concentration in the confinement layers 1 and 5 and the separating layer 3, for example, to be:

$x_0 \approx 0.16$ and through choosing the aluminium (Al) concentration in the ternary layer 2 which forms the waveguide $G_1$ in the order of:

$x_1 \approx 0.11$

The multiple quantum wells (MQW) 4 for forming the waveguide $G_2$ may consist of 30 layers of ternary material alternating with 30 layers of binary material of III-V composition, such as, for example, gallium arsenide for the binary layers and gallium-aluminium arsenide for the ternary layers (GaAs/GaAlAs). Each layer will favourably have a thickness in the order of 10 nm. The composition of the ternary material in a favorable case will be $Ga_{0.7}Al_{0.3}As$.

To transport a single-mode transversal wave, the total thickness of the layers 2 and 4 forming the waveguides $G_1$ and $G_2$ will be in the order of 0.4 to 0.7 $\mu m$, favorably 0.6 $\mu m$. The thickness of the first and second confinement layers 1, 5 is not critical, and may be in the order of 0.5 to 1 $\mu m$.

The thickness D of the separating layer 3 is determined as a function of the length L of the switching element to achieve that in the no-bias state, i.e. the absence of any bias voltage V applied between the contacts N and P (V=0), all the luminous power $\phi_0$ applied at the input end of the waveguide $G_1$ is transferred to the waveguide $G_2$ through the separating layer 3 in the course of the path L.

The switch is then said to be in the crossover state.

It should be noted that, from this point onwards, the functioning of the device according to the invention is completely different from that of the switch known according to the present art, or from the functioning of the PIN diode equally known according to the present art.

In fact, as far as the switch known according to the present art is concerned, firstly it can only be controlled from the outside, which necessitates a supplementary circuit to generate this control, whereas in the device according to the invention the switching is induced by a variation in the luminous intensity, so by the luminous signal itself; and secondly, the order in which the layers of the known circuit are realized render it impossible for it to function according to the invention since it cannot be adapted to the PIN-type structure.

As far as the known PIN diode is concerned, its operation is based on a different principle from the one which is utilized in the switch according to the invention.

Figure 2A:
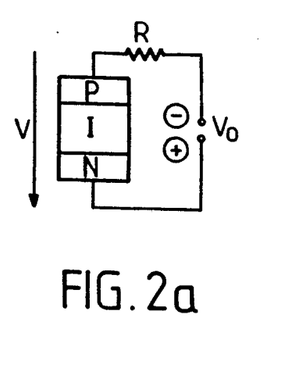
FIG. 2a represents a bias voltage circuit applicable to the optoelectronic switch according to the invention for realizing a control voltage.
Figure 2B:
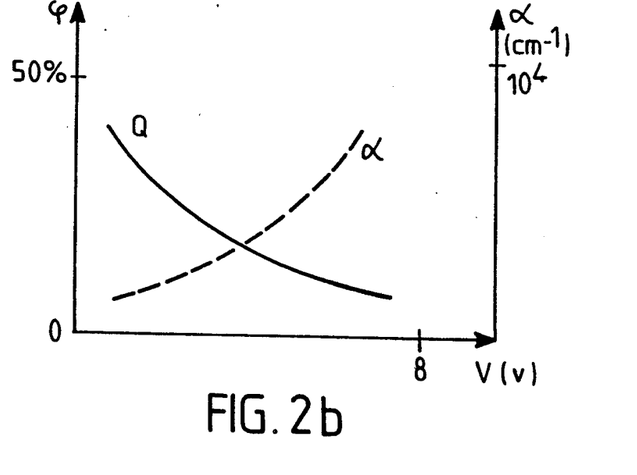
FIG. 2b represents on the one hand the absorption $\alpha$ and on the other hand the quantity of light detected Q in the multiple quantum well MQW as a function of the reverse bias voltage V at the contacts of the structure.

In fact, as was noted before, in the known diode which is illuminated perpendicularly to the layers, the absorption in the multiple quantum wells considered for a given wavelength as a function of the reverse bias voltage applied to the contacts of this diode, for example by means of a circuit such as is shown in FIG. 2a, shows two peaks. The falling portion of the curves away from the first maximum corresponds to a region of negative photoconductance. By contrast, according to the invention, and as shown in FIG. 2b, the broken-line curve representing the absorption $\alpha$ ($cm^{-1}$) in the multiple quantum wells as a function of the reverse bias voltage V (Volt) shows a continuous rise. This is due to the fact that an operational zone was chosen in which the photon energy is fixed at approximately 30 meV below the threshold of the first energy transition of the so-called heavy-hole exciton, for which energy the quantum well shows little absorption.

On the other hand, in the device according to the invention, the absorption is not the sole phenomenon which plays a part in establishing feedback when a reverse bias voltage is applied to the PIN diode, owing to the existence of the two coupled light waveguides.

In fact, the quantity of light detected by the waveguide $G_2$ formed by multiple quantum wells (MQW) should also be taken into account. The full-line curve of FIG. 2b shows the development of this quantity of light Q as a function of the same bias voltage V.

The curves $\alpha$ and Q of FIG. 2b serve to show that the device functions in accordance with the principles explained below and with a characteristic of multiple quantum wells which is called "Quantum Confine Stark Effect" (QCSE), while still different from the principles which govern the operation of the PIN diode or of the known switch, which functions as a modulator.

The optical properties of the multiple quantum well (MQW) are dependent on the reverse bias voltage applied to the contacts of the PIN junction, since they are influenced by the electric field created perpendicularly to the layers.

Figure 2C:
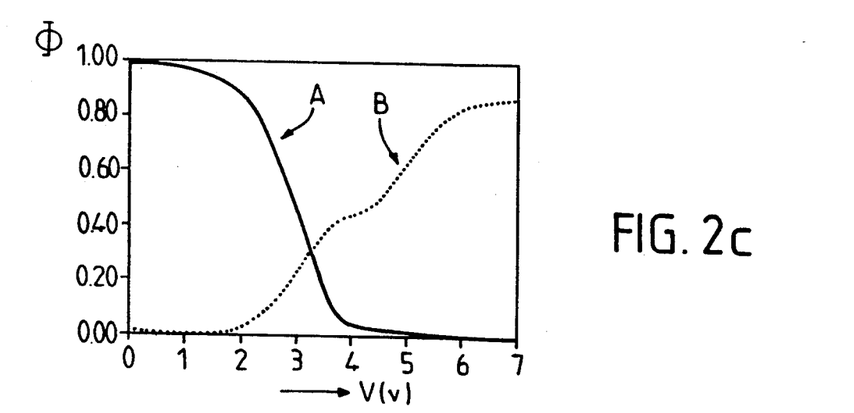
FIG. 2c represents graphically the luminous output power in each of the waveguides of the optoelectronic switch as a function of the voltage V.

As shown in FIG. 2c, and just as in the first switching device described as belonging to the present art, the system is so designed that, when the bias voltage is zero (V=0) as a result of the chosen coupling length L, all the light entering the first waveguide $G_1$ passes into the second waveguide $G_2$ consisting of multiple quantum wells (MQW): the crossover state then obtains, as is illustrated by the curves of FIG. 2c. The full-line curve A represents the power $\phi_2$ divided by a constant input power $\phi_1$, which exits from waveguide $G_2$ as a function of the bias voltage value V in volts. The dotted curve B represents the power $\phi_1$ divided by the input power $\phi_0$ which exits from waveguide $G_1$ as a function of the bias voltage value V is Volt.

When the bias voltage is increased, the optical characteristics of the waveguide consisting of multiple quantum wells (MQW) are changed, and all the light remains in the input guide $G_1$ (straight-through state) in the case of sufficiently high voltages V, the coupling phenomenon thus being modified.

Indeed, in view of the considerable absorption of the multiple quantum wells (MQW) it is essential that a minimum of the signal should be transported by the waveguide $G_2$ at high bias values. This is why the coupling length is so chosen that the switch is in the crossover state for low values of V, or for V=0, and in the straight-through state for high values.

This was already known in the existing state of the art. The originality of the present invention, however, lies in the existence of the bias circuit which is applied, no longer to the simple known PIN structure, but to the complex switch structure.

A first bias circuit is shown in FIG. 2a and consists of a resistance R and a source of a constant reverse bias voltage $V_0$ applied to the PIN diode through the resistance. This bias circuit leads to a relation between the current flowing in the circuit and the voltage at the contacts of the PIN diode, which relation is as follows:

$$I = f(V) \qquad (1)$$

Given a certain voltage at the contacts of the device, the control circuit reacts by establishing a certain current strength as defined by the relation (1), and vice versa. Furthermore, the light absorbed in the multiple quantum wells (MQW) is another source of current. In fact, whenever a photon is absorbed in the multiple quantum wells, an electron-hole pair is created owing to the electric field existing in the PIN junction and creating a current.

If the luminous power $\phi_0$ injected into the input waveguide $G_1$ is then considered, the quantity of light Q effectively detected in the region of the multiple quantum wells or second waveguide $G_2$ depends on the state of the switch.

If the switch is in the straight-through state, nothing is detected in the region of multiple quantum wells, so the result is that $Q \simeq 0$. If on the other hand the switch is in the crossover state, the quantity of light Q effectively detected as being present in the intrinsic region of the device is great.

Thus the photocurrent generated is simultaneously proportional to two factors:

on the one hand, to the absorption in the multiple quantum wells (MQW) $G_2$, on the other hand, to the quantity of light $Q \times \phi_0$ which is found effectively at the same moment in the said multiple quantum wells (MQW) $G_2$.

The device according to the invention thus shows various types of operation. First of all, two extreme cases, and furthermore an intermediate case.

In the extreme cases:

either the absorption is practically zero in the MQW, the generated photocurrent is very low, and all the light passes into the waveguide $G_2$; the crossover state obtains;

or the absorption is strong, the generated photocurrent is still very low since all the light remains in the waveguide $G_1$.

In the intermediate case:

a compromise is established between the absorption $\alpha$ in the MQW, i.e. the capacity of the MQW to detect the light, and the fraction of the luminous power capable of being detected.

The ratio of the quantity of photogenerated current to the optical input power a $\phi_0$, which is called detectivity $S = I/\phi_0$, is thus proportional simultaneously to the absorption $\alpha$ and to the quantity Q. The detectivity S, therefore, is the composite of the two curves representing $\alpha$ and Q in FIG. 1b. Consequently, it has the form given by the curve C in FIG. 2d, i.e. it has a maximum as a function of the bias voltage V. The detectivity generated is thus a function of V. It is written as S(V).

Figure 2D:
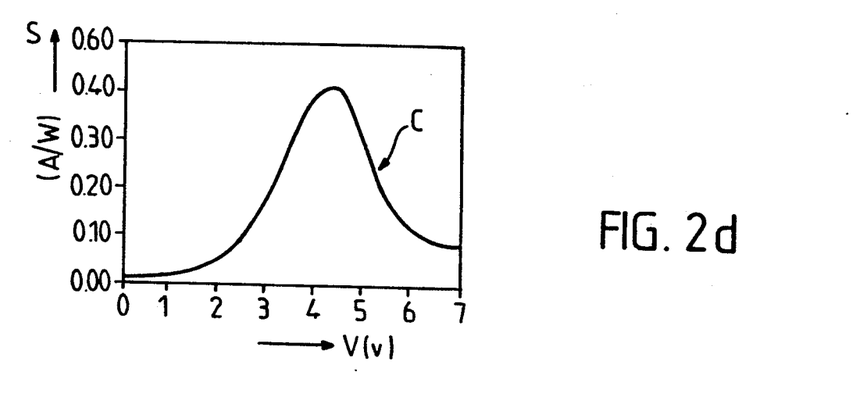
FIG. 2d represents the quantity of photogenerated current in the multiple quantum well structure as a function of the bias voltage.

Just as in the present art, a region corresponding to the falling portion of the curve S(V) is obtained in which the photoconductance is negative, but the origin of the physical phenomenon is different since there is a composite here of the absorption $\alpha$ and the quantity Q, and not the effect of the absorption only as in the present art. The photogenerated current I is thus proportional simultaneously to the input power $\phi_0$ and to the detectivity S(V):

$$I = S(V) \times \phi_0 \qquad (2)$$

Since on the other hand the current caused by the bias circuit is given by the relation (1), the state of the switch will be given by the combination of these two functions (1) and (2):

$$I = f(V) \qquad (1)$$

$$I = S(V) \times \phi_0 \qquad (2)$$

If the bias circuit is formed in a simple way, as shown in FIG. 2a, from an electric supply for the voltage $V_0$ and the resistance R arranged in series, the current I in the resistance R is given by the following relation, taking into account the supply voltage $V_0$ and the voltage V at the contacts of the PIN diode:

$$I = (V_0 - V)/R \qquad (3)$$

On the other hand, the quantity of photogenerated current S(V) is given by:

$$S(V) = I/\phi_0 \qquad (4)$$

derived from the relation (2).

The state of the system will thus be given by resolving the system:

$$S(V) = (V_0 - V)/R\phi_0 \qquad (5)$$

Figure 2E:
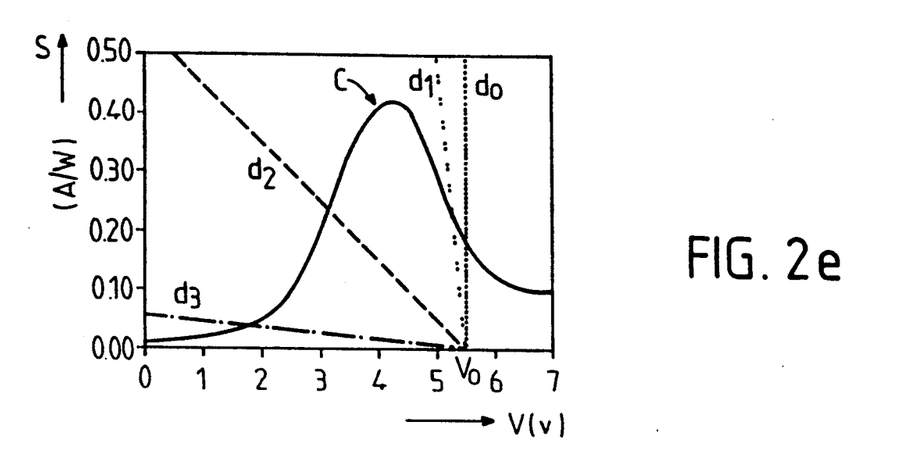
FIG. 2e represents on the one hand the detectivity S (curve C) and on the other hand the circuit bias charge lines (curves $d_0$ to $d_3$) as a function of V.

FIG. 2e shows various lines $d_0$, $d_1$, $d_2$, $d_3$ representing:

$(V_0 - V)/R\phi_0$ for various values $\psi_0$, $\psi''_0$, $\psi'''_0$, etc., of the input power $P_0$.

Thus a line $d_0$, $d_1$, $d_2$, $d_3$, etc. exists for each value of the input power $\phi_0$ in the bias circuit of FIG. 2a, of which line the gradient is a function of this input power, the continuous supply voltage $V_0$ and the resistance R being constant.

By choosing $V_0 = 5.5$ volts $R = 1$ M$\Omega$ for various values of the luminous input power $\phi_0$, the following is obtained, as shown in FIG. 2e:

the line $d_0$ for $R\phi_0 = 0$ the line $D_1$ for $R\phi_0 = 1$ the line $d_2$ for $R\phi_0 = 100$ the line $d_3$ for $R\phi_0 = 10.000$ Resolution of the system (5) may be done graphically by means of the curves of FIG. 2e by intersecting one of the curves $d_0$, $d_1$, $d_2$, $d_3$ with the curve C which represents S(V). This intersection makes it possible to read graphically the value of the voltage V present at the contacts of the PIN diode.

The voltage V read in FIG. 2e at the intersection of the curve C and the lines $d_1$, $d_2$, $d_3$, $d_4$ is transferred to FIG. 2c and makes it possible to recognize the state of the switch for this value of the voltage V. The switch is thus in the straight-through or crossover state, which state depends solely on the power $\phi_0$ injected at the input.

Figure 2F:
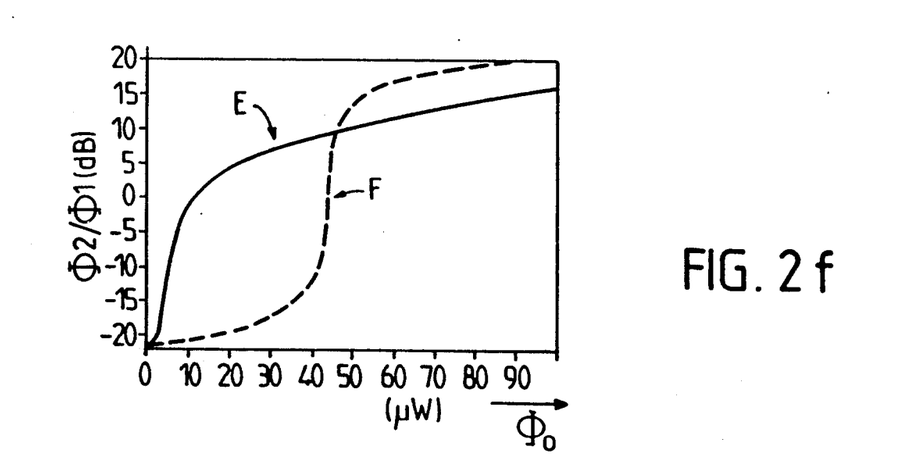
FIG. 2f represents the output power ratios $\phi_1$ and $\phi_2$ in each of the waveguides as a function of the input power.

FIG. 2f shows the ratios $\phi_2/\phi_1$ of the luminous powers received at the outputs of the waveguide $G_2$ (MQW) and the waveguide $G_1$, respectively, as a function of the luminous power $\phi_0$ injected into the input waveguide $G_1$ in the case in which it is not MQW. This curve is drawn for the example in which $R = 1$ M$\Omega$ $V_0 = 5.5$ Volts with the bias circuit of FIG. 2a.

This FIG. 2f shows by means of full-line curve E that an input power of 100 $\mu$W makes it possible to obtain a difference between the output of $G_2$ and the output of $G_1$ of 15 dB.

The broken-line curve F in the same FIG. 2f is drawn for a value $R = 100$ K$\Omega$. In both cases (curve E and curve F) it is clear that the transition which permits of the passage from the crossover state to the straight-through state is very abrupt.

The device according to the invention can thus be optimized by the choice of an appropriate value for resistance R as a function of the power $\phi_0$.

Figure 3A:
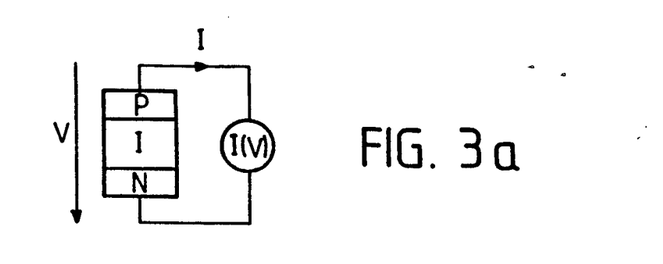
FIG. 3a represents a modification of the bias voltage circuit of the switch according to the invention for realizing a control current.

In a modification, the bias circuit of the PIN structure for obtaining the feedback is a current supply as represented, for example, in FIG. 3a. In this case:

$$I(V) = I_0 \text{ if } V < V_0 \quad (5)$$

$$I(V) = 0 \text{ if } V > V_0$$

V is chosen to be, for example, 7 volts.

Figure 4A:
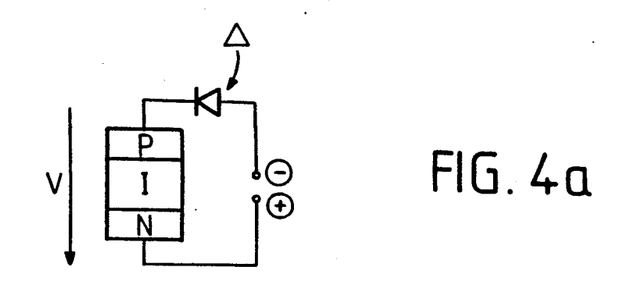
FIG. 4a represents another modification of the bias voltage system of the switch according to the invention for realising a control current.

This can be achieved by means of an external photodiode Δ disposed in series with a constant voltage supply as shown in FIG. 4a. The bias point of the system is determined from:

$$S(V) = I(V)/\phi_0 \quad (6)$$

Figure 3B:
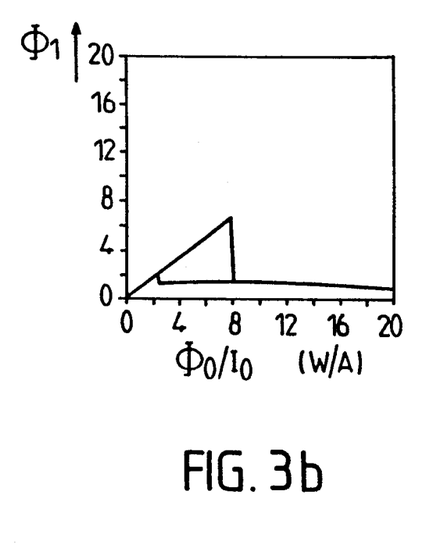
FIGS. 3b and 3c represent the output powers, $\phi_1$ and $\phi_2$, respectively, as a function of the ratio of the input power $\phi_0$ to the current $I_0$ in such a system.
Figure 3C:
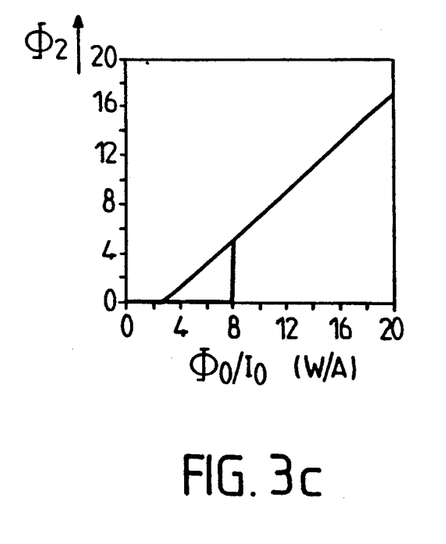

The number of solutions to this equation depends on the value of the ratio $I_0/\phi_0$. Thus, if $I_0/\phi_0$ is higher than $S(V)$, then $V = V_0$ and the switch is in the straight-through state. If $I_0/\phi_0$ is lower than $S(V_0)$, the only stable state is the region of weak bias, which means that the switch is in the crossover state. Between these two extremes the system is bistable. This is shown in FIGS. 3b and 3c in which the output powers $\phi_1$ and $\phi_2$ of the waveguides $G_1$ and $G_2$, respectively, are shown as a function of the ratio $\phi_0/I_0$, $I_0$ having a fixed value.

The bistability may be induced in two ways, either by changing $I_0$, or by changing $\phi_0$. In the case of control through the optical power $\phi_0$, the switching powers may be adjusted through $I_0$, but they are limited by the dark current of the PI-N junction. Switching operations with powers of a few μW can nevertheless be easily realized.

Figure 4B:
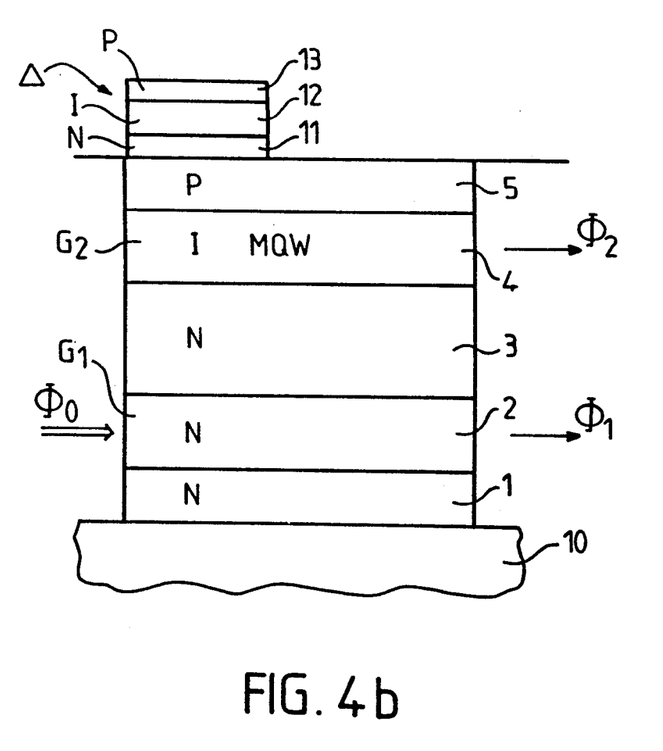
FIG. 4b represents diagrammatically an embodiment of this biasing device.

FIG. 4b shows in an embodiment of this modification of the bias device how a PIN diode is realized at the surface of the second layer of the vertical structure by means of layers of materials of the III-V group, for example with the same materials as the structure of the switching element.

Generally, to minimize the losses in the crossover state, the calculations for the design of the devices according to the invention are made for a photon energy of 30 meV below the first energy transition of the heavy-hole excitation, at which energy the quantum well shows little absorption.

It has been taken into account that in the case of multiple quantum wells (MQW) realized by means of alternating layers of GaAs/GaAlAs, with an Al concentration in the ternary material of $x_1 = 0.11$, the refractive index is approximately 1% higher than in an equivalent GaAlAs alloy.

In this embodiment having a single MQW structure, the thickness of the separating layer preferably was
D = 1 μm
and the coupling length
L = 228 μm.

The refractive index for a structure realized with the materials GaAs and GaAlAs is:
$n_1 = 3.5433$ in waveguide $G_1$ (non-MQW) and
$n_0 = 3.5061$ in the confinement layers 1 and 5 and the separation 3.

EMBODIMENT II

Figure 1B:
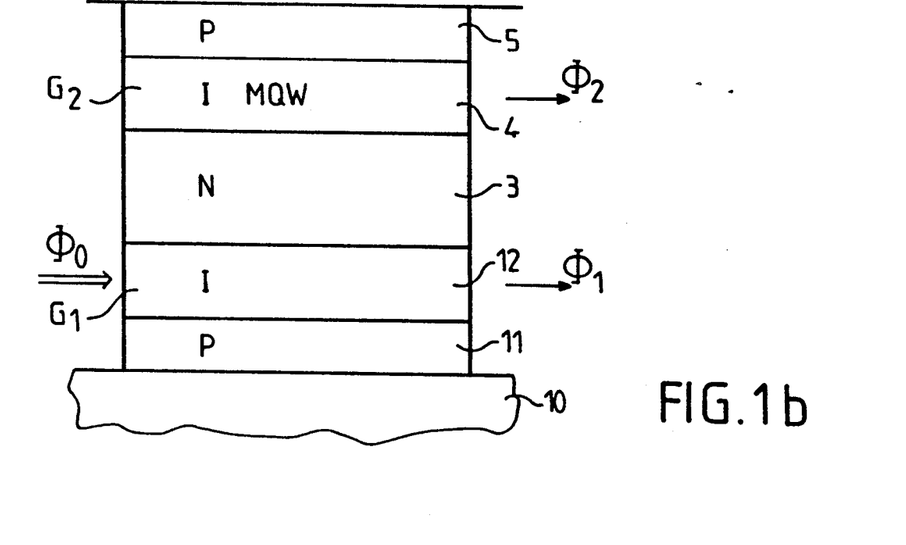
FIGS. 1b, 1c and 1d represent modifications of this vertical structure for realising an optoelectronic switch according to the invention.

As is shown in FIG. 1b, in a modification of the invention, the vertical structure of the semiconductor material layers for realizing the switch forms a phototransistor. To this end, this vertical structure comprises:
a substrate 10 which may be semi-insulating,
a first confinement layer 11 of the p-type,
a region 12 for forming the waveguide $G_1$ which receives the luminous input power and which coincides with a first intrinsic zone I,
a separating layer 3 of the n-type,
a region 4 of multiple quantum wells (MQW) for forming the second waveguide $G_2$, coinciding with a second intrinsic region I,
a second confinement layer 5 of the p-type.

The dimensions of this structure, i.e. the refractive indices of the materials, the thickness of the separating layer, and the coupling length L are so chosen that in the zero-bias state (V = 0) the switch is in the crossover state.

The materials and the layers may be of the same composition as described above. Generally, the materials will be chosen in the following way, as a function of the substrate for achieving simultaneously lattice compatibility and the refractive index necessary for confinement:

if the substrate consists of gallium arsenide, the non-MQW layers forming the light waveguide $G_1$ (region 12) may be ternary, for example of gallium-aluminum arsenide (GaAlAs), just as the confinement layers.

if the substrate consists of indium phosphide (InP), the non-MQW layers forming the light waveguide $G_1$ (region 12) may be ternary or quaternary, for example gallium-indium arsenide (GaInAs) or a compound of gallium, indium, phosphorous, arsenic (GaInAsP), just as the confinement layers.

The MQW structures will thus be formed by an alternation of chosen binary layers and chosen ternary or quaternary layers.

It is also possible to use a silicon substrate (Si) covered by a buffer layer for realizing the lattice compatibility, then a layer of GaAs or InP, which will then be considered as the substrate.

The bias circuits are the same as those for the device with a single intrinsic region described above and illustrated in FIG. 1a.

In this modification, the device according to the invention offers a gain between 10 and 100 and, consequently, the optical powers necessary for operation are correspondingly smaller.

EMBODIMENT III

Figure 1C:
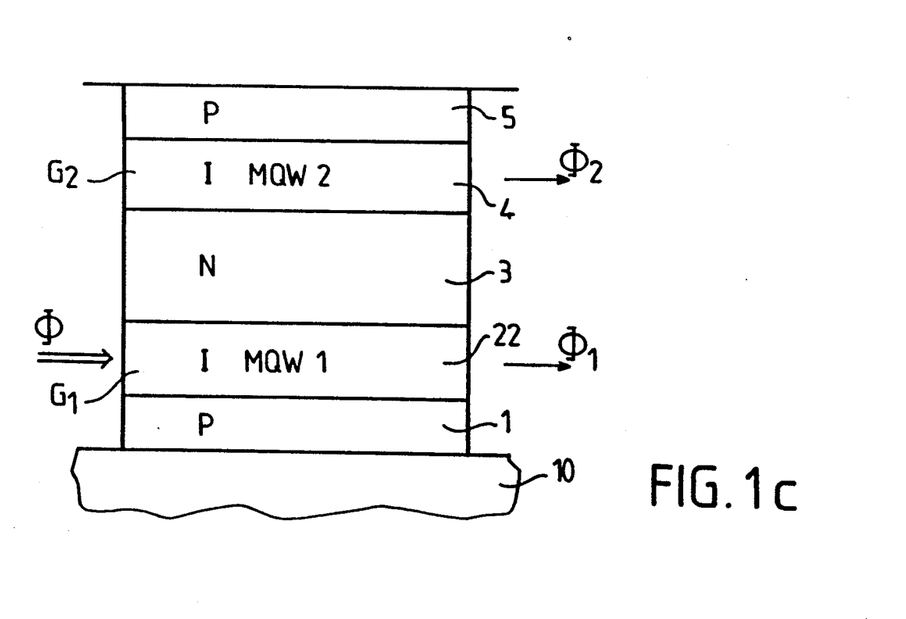
Figure 1D:
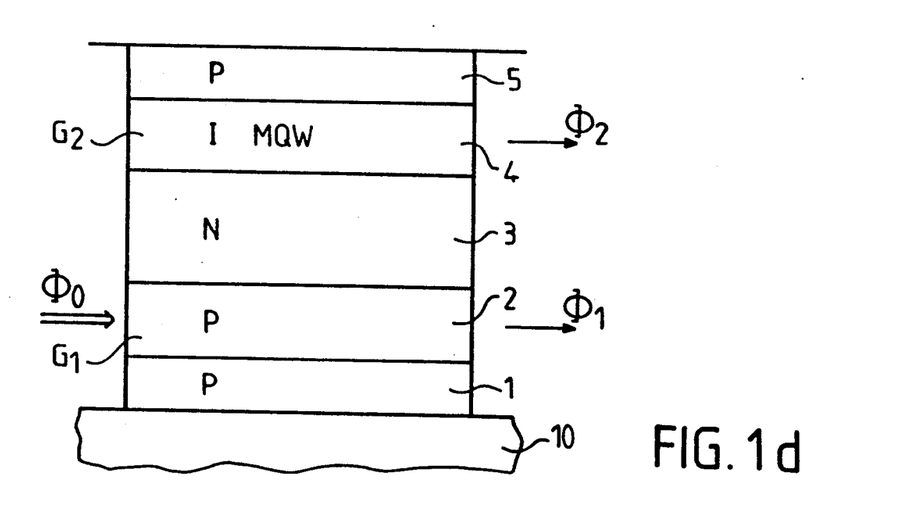

As is shown in FIG. 1c, another modification of the vertical structure constitutes a phototransistor, as in embodiment II. To this end, this vertical structure comprises:
a substrate 10, which may be semi-insulating,
a first confinement layer 11 of the p-type,
a region 22 of multiple quantum wells ($MQW_1$) forming the waveguide $G_1$ which receives the input luminous power and which coincides with a first intrinsic zone I,
a separating layer 3 of the n-type,
another region 4 of multiple quantum wells ($MQW_2$) forming the second waveguide $G_2$ and coinciding with a second intrinsic region I,
a second confinement layer 5 of the p-type.

The dimensions and characteristics of this structure are so arranged that in the no-bias state (V = 0) the switch is in the crossover state.

The materials maybe the same as those of the corresponding regions of embodiments I and II.

The bias circuits described above may also be used.

It should be noted that the interest of this embodiment lies in:

on the one hand, the fact that a gain is achieved, as in embodiment II, on the other hand, the fact that the two waveguides are identical, which is more easy to realise technologically. The waveguides also have the same refractive index. This is counterbalanced by the fact that the waveguide $G_1$ has greater losses when it is realised as an MQW structure than when it is realised in ternary material, as in embodiment II.

EMBODIMENT IV

As is shown in FIG. 1b, another embodiment of the vertical structure constitutes a phototransistor, as in the embodiments II and III. To this end, this vertical structure comprises:

a substrate 10, which may be semi-insulating, a first confinement layer 11 of the p-type, a region 32 of the p-type forming the first waveguide $G_1$ which receives the luminous input power, a separating layer 3 of the n-type, a region 4 of multiple quantum wells (MQW) forming the second waveguide $G_2$ and coinciding with an intrinsic region I, a second confinement layer 5 of the p-type.

The dimensions and characteristics of this structure are so arranged that in the no-bias state the switch is in the crossover state.

The materials for making the layers may be the same as those of the corresponding regions in the embodiments I, II and III.

The bias circuits described above may also be used.

The interest of this embodiment lies in the fact that it offers a greater current gain than the embodiments II and III, in particular higher than embodiment II.

EMBODIMENT V

In this embodiment, the directional coupler has a horizontal structure. Preferably, this structure is of the ribbon type applied on a substrate (RIB waveguides).

Figure 7:
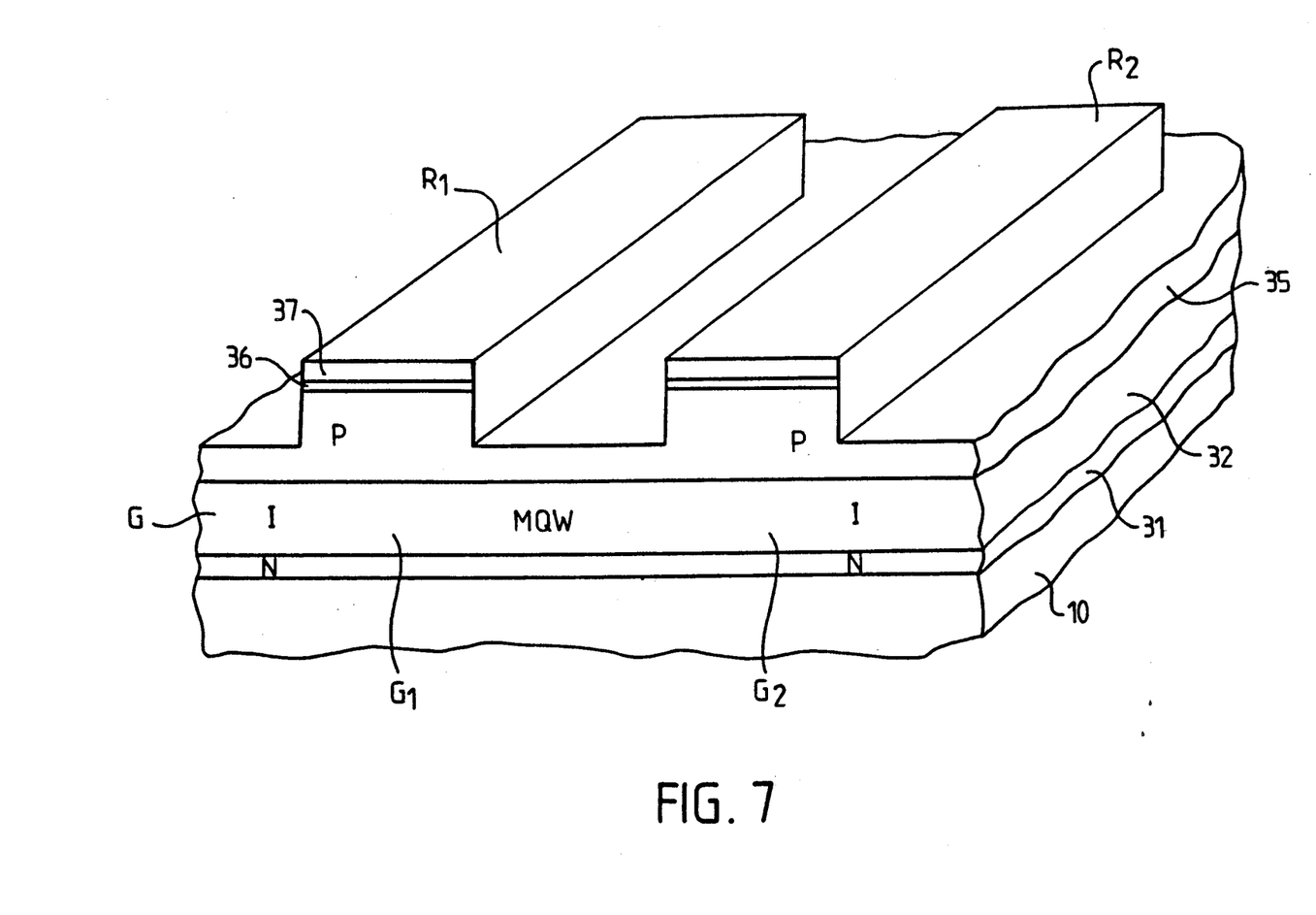
FIG. 7 represents a switch according to the invention with a horizontal structure.

To this end, this horizontal structure may be formed from:

a substrate 10, a lower confinement layer 31 of the n-type, a region 32 of multiple quantum wells (MQW) forming the guiding layer G, i.e. the guided regions $G_1$ and $G_2$, and coinciding with an intrinsic region I, an upper confinement layer 35 of the p-type in which are formed, for example by engraving, ribbons $R_1$ and $R_2$ for $G_1$ and $G_2$, respectively, which ribbons are applied in relief on top of the device. Owing to the difference in refractive index occurring in the upper confinement layer, which results from the difference in thickness in the regions of the ribbons $R_1$, $R_2$ and outside these regions, the light is guided in the portions of the guiding layer G which are immediately below the ribbons, so in the portions $G_1$ and $G_2$. The light waveguides $G_1$, $G_2$ are thus directly limited by the ribbons $R_1$, $R_2$, respectively.

The materials for realizing such a horizontal structure may be:

gallium arsenide for the substrate 10. This may be, for example, semi-insulating or n-type;

a ternary layer of GaAlAs for the lower confinement layer 31. The thickness may favorably be 0.15 $\mu$m;

the structure of multiple quantum wells for forming the guiding layer 32 (G) may be identical to the structures of the multiple quantum wells described in the preceding embodiments. The thickness may favorably be 0.5 $\mu$m;

a ternary layer of GaAlAs for the upper confinement layer 35. After engraving for forming the ribbons, a thickness of 0.3 $\mu$m will favorably remain of the confinement layer, and the ribbons will be raised above the surface to a height of 0.5 $\mu$m. As was noted above, the ternary GaAlAs material is chosen if the substrate is made of gallium arsenide (GaAs). Other compounds referred to above are used if the substrate is made of indium phosphide (InP).

The interest of this embodiment lies first of all in the simplicity of its implementation. In fact, to realize a horizontal structure, it suffices to deposit 3 layers (31, 32, 35), whereas a minimum of 5 layers is required for realizing a vertical structure.

Secondly, the lateral confinement of the beam induces fewer losses by diffusion connected with the roughness in the case of a directional coupler with a horizontal structure than in the case of a vertical structure, which compensates for the fact that the coupling length L is greater for the horizontal structure, since the distance between the waveguides is generally greater, as is known to those skilled in the art.

Moreover, the horizontal structure is more favorable for realizing a switching matrix because the switching elements are easier to realize.

Figure 8:
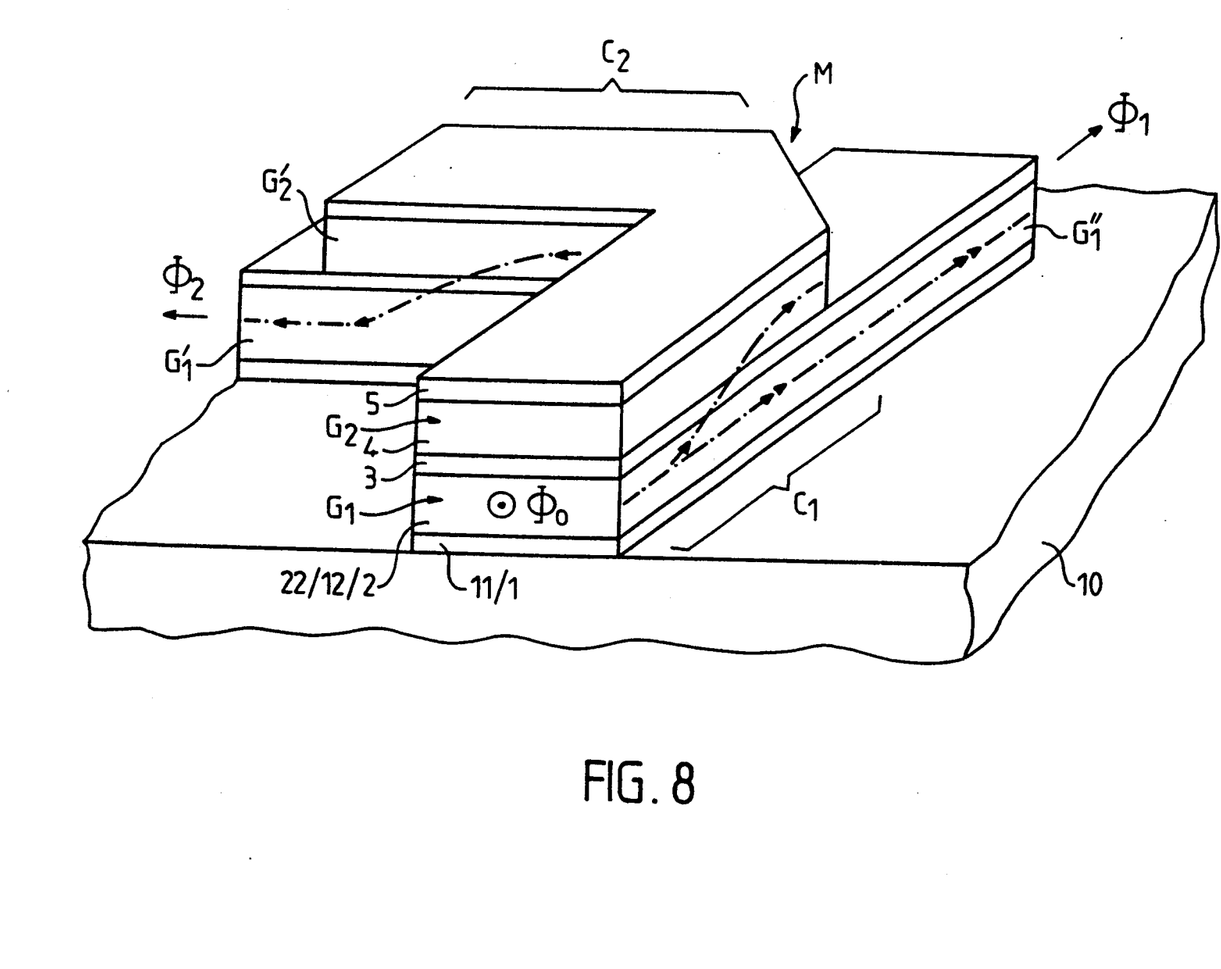
FIG. 8 represents a switching element realized by means of a vertical switch according to the invention for manufacturing a switching matrix.

Finally, the engraving step which makes it possible to realize the ribbons (RIB) of the horizontal structure is easier to realize than that which is necessary for realizing the lateral confinement of the vertical structure (see FIG. 8 which shows how the assembly of the vertical cascadable structure is superimposed in relief on a substrate by means of lateral engraving).

So each of these structures, vertical and horizontal, has different advantages and disadvantages. The vertical structure will be chosen for its compactness, which is favorable for integrated devices on a very large scale; on the other hand, the horizontal structure will be chosen for its ease of manufacture and low losses.

In either case, the electrical contacts will be realized by means of a layer or pad of a material which forms ohmic contact.

for example, Ti/Pt/Au (reference numeral 37 in FIG. 7) on a layer of GaAs of the p+-type (reference numeral 36 in FIG. 7) for forming the p-type contact;

for example, Au/Ge on a layer of GaAs of the n-type for forming the n-type contact.

The simple PIN structure (diode structure=embodiment I) will preferably be voltage-controlled, while the phototransistor structure (embodiments II, III, IV, V) will preferably be current-controlled.

Figure 5A:
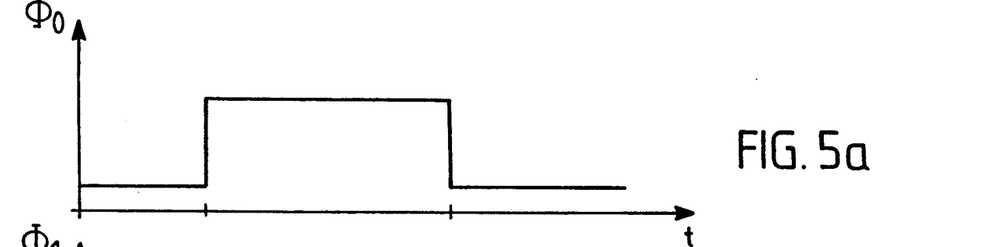
FIGS. 5a, 5b and 5c represent the signal transport sequence by the switch in the case of a reverse bias voltage being applied to the PIN structure.
Figure 5B:
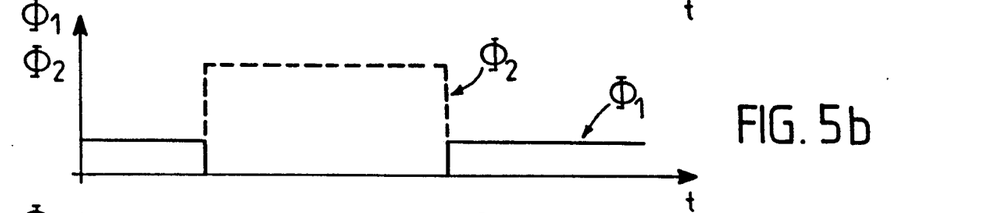
Figure 5C:
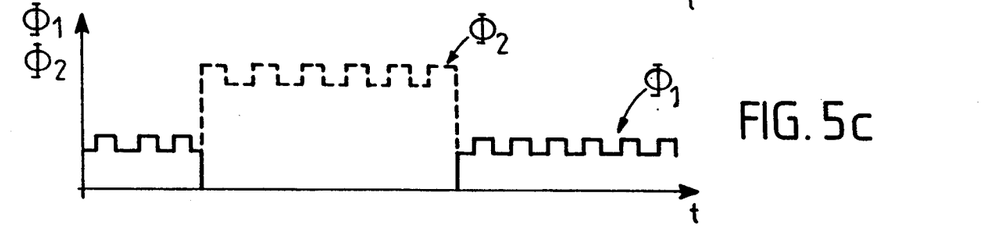

The devices according to the invention in the simple PIN structure version, or in the phototransistor versions, find their application, for example, either in switching pure and simple controlled by the input power $\phi_0$, or in the switching of signals carried by a carrier, as shown in FIG. 5.

For a given wavelength, for example:

$\lambda = 865$ nm

The signals $\phi_1$ carried by a signal of low luminous input power $\phi_0$ shown in FIG. 5a as a function of time t go out straight-through in the waveguide $G_1$, whereas the signals $\phi_2$ carried by a strong luminous input power pass into the second waveguide $G_2$ (FIGS. 5b and 5c).

The switching depends exclusively on the input power $\phi_0$, as is shown by the curves of FIG. 2f.

Figure 6A:
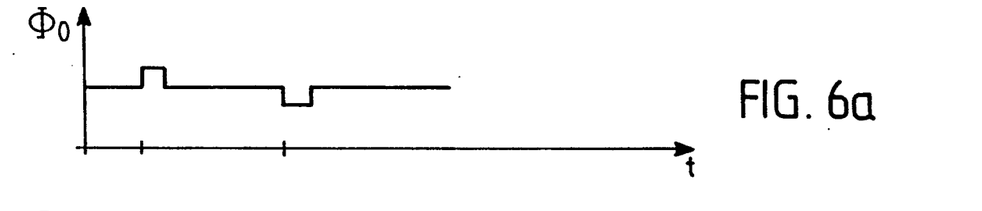
FIGS. 6a, 6b and 6c represent the signal transport sequence by the switch in the case where a control current is applied to the PIN structure.
Figure 6B:
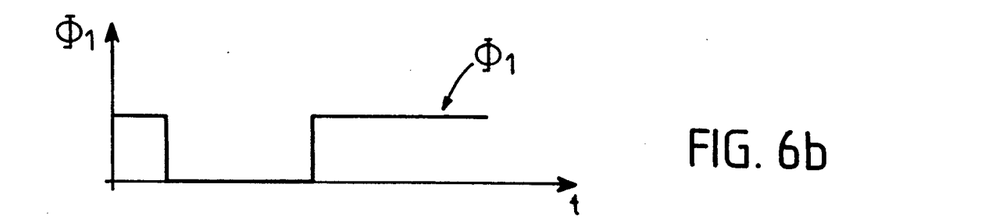
Figure 6C:
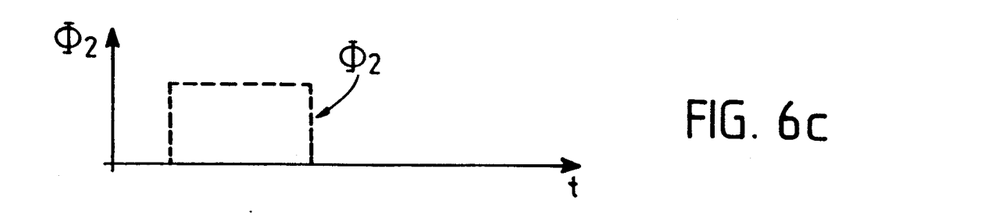

In the embodiment in which the PIN structure receives its bias by way of current control (FIGS. 3 and 4), a memory effect is obtained as illustrated diagrammatically in FIGS. 6a to 6c.

The input power $\phi_0$ is represented by the curve of FIG. 6a. If this input power $\phi_0$ is given a peak in one direction, the output goes through one of the waveguides. When the input power $\phi_0$ returns to its initial value, the signal remains in the same waveguide. When a peak is applied in a different direction to the input power $\phi_0$, the signal passes into the other waveguide and remains there even if the input power $\phi_0$ should return to its initial value (see FIGS. 6b and 6c).

The absorption in all layers has been disregarded in the calculations, except for the MQW structure.

The invention is not limited to the realization in a GaAlAs/GaAs system, but may be extended to, for example, the GaInAs/InP system, as was stated above, or alternatively to the GaInAsP/InP system.

Similarly, the substrate may be of any material having a compatible lattice, and even of silicon, for example provided with a lattice adaptation layer followed by a layer of, for example, GaAs or InP. Taking this as a starting point, the device according to the invention is manufactured as described above.

EMBODIMENT VI

In this example, a process is indicated for realizing a switching element provided with means for separating the beams of the first and the second waveguide with the aim of manufacturing a cascadable switching element which can serve as the basis for manufacturing a switching matrix of Q inputs and Q outputs.

This example is applied to one of the vertical structures described in embodiments I, II, III or IV and is illustrated diagrammatically in FIG. 8.

As is shown in FIG. 8, this element comprises a substrate 10 on which a first directional coupler $C_1$ with vertical structure is realized, as explained above.

At the exit end of this directional coupler $C_1$, i.e. after a length equal to the coupling length L, a mirror M is arranged exclusively in the path of the beam of the upper guide, here $G_2$. This mirror M may be formed by a vertical edge which encloses a certain angle with the optical axis of the waveguide structure. Such a vertical edge may be realized by partial engraving simultaneous with the overall engraving which renders possible the lateral confinement of the waveguides of the vertical structure.

Symmetrically relative to the perpendicular to mirror M, a second directional coupler $C_2$ identical to the first one is realized. This system, obviously, is formed simultaneously with the coupler $C_1$ and the mirror M by means of a masking operation and engraving of the layers.

The waveguide $G_1$ will have its prolongation in $G''_1$, and the mirrored portion of the waveguide $G_1$ will have its prolongation in $G'_1$ beyond the coupling length L, whereas the upper waveguide $G_2$ and its mirrored portion $G'_2$ are limited to the coupling length L.

Depending on the input power $\phi_0$, a beam entering in $G_1$ will exit either at the end $G''_1$, the prolongation of the input guide $G_1$, with a power $\phi_1$, or it will pass into $G_2$. In the latter case it will be reflected by the mirror M and pass into the mirrored portion $G'_2$ of $G_2$. Since the coupler $C_2$ has a length L corresponding to one crossover exit, in the zero-bias state, the signal will pass into $G'_1$ and will subsequently be transported through the prolongation of $G'_1$ with a power $\phi_2$.

Thus arranged, this structure will accordingly require the realization of electric bias contacts only for the first coupler $C_1$, and not for the second. The electrical contacts will thus be realized either on the outermost layers 3 of $C_1$ only (if $C_1$ is constructed according to the embodiments II, III, V), or on the N and P layers of $C_1$ (if $C_1$ is constructed according to embodiment I). The elements formed by $C_1+C_2$ are directly cascadable. They are called basic elements.

It is thus possible to realize a switching matrix of Q by Q waveguides by placing Q×Q of these basic elements in cascade fashion in two directions on the surface of a substrate.

Preferably, the mirror M is provided at an angle of 45° to the optical axis of the first coupler $C_1$. The two couplers $C_1$, $C_2$ are then at right angles to one another.

I claim:

1. An integrated semiconductor device which forms an optoelectronic switch and comprises:
   a directional coupler structure in which a first waveguide receives input light power and a second waveguide is formed by multiple quantum wells, said directional coupler structure being so dimensioned that in the zero-bias state the switch is in the crossover state; and
   switching control means, characterized in that:
   the directional coupler structure comprises layers which form at least one PIN structure in which said second waveguide comprising multiple quantum wells constitutes an intrinsic region I; and
   the switching control means includes means for reverse-biasing the PIN structure which supplies a feedback signal to achieve switching from one state to another initiated by a change in level of the input light power injected into said first waveguide.

2. A device as claimed in claim 1, characterized in that it comprises a second PIN structure having an input waveguide which forms the intrinsic region and which is forward biased.

3. A device as claimed in claim 2, characterized in that the input waveguide is formed by multiple quantum wells.

4. A device as claimed in claim 1, 2 or 3, characterized in that the structure of the directional coupler is of the vertical type and comprises a separating layer of a first conductivity type disposed between the first and second waveguides, and first and second confinement layers of a second, opposite conductivity type disposed on either side of the waveguides.

5. A device as claimed in claim 4, characterized in that the confinement layer adjacent to the first waveguide, designated the first confinement layer, and the first waveguide are of the same conductivity type as the separating layer.

6. A device as claimed in claim 4, characterized in that the confinement layer adjacent to the first waveguide, designated the first confinement layer, and the input waveguide are of the conductivity type opposed to that of the separating layer.

7. A device as claimed in claim 4, characterized in that the confinement layer adjacent to the first waveguide is of the conductivity type opposed to that of the separating layer.

8. A device as claimed in claim 4, characterized in that a mirror is provided in the path of an upper one of said first and second waveguides of the vertical structure at the end of the coupling length, and in that a second directional coupler of identical structure and dimensions is provided in the axis of reflection of said mirror.

9. A device as claimed in claim 8, characterized in that the mirror is formed by a flat interface perpendicular to the plane of the layers and arranged at an angle of 45° to the optical axis of the first directional coupler.

10. A device as claimed in claim 4, characterized in that the separating layer between the first and second waveguides of the directional coupler structure is of the n-conductivity type.

11. A device as claimed in claim 3, characterized in that the structure of the directional coupler is of the horizontal type and comprises a guiding layer formed by multiple quantum wells to constitute the first waveguide and the second waveguide, on either side of which latter waveguide are disposed lower and upper confinement layers of the opposing conductivity type, which guiding layer constitutes the intrinsic region of the two PIN structures.

12. A device as claimed in claim 11, characterized in that the upper confinement layer is provided with ribbons raised in relief for delimiting the first waveguide and the second waveguide.

13. A device as claimed in claim 11 or 12, characterized in that the lower confinement layer is of the n-conductivity type.

14. A device as claimed in claim 1, 2 or 3, characterized in that a p-type contact is provided on the p-type layer, and an n-type contact is provided on the n-type layer of the PIN structure.

15. A device as claimed in claim 14, characterized in that the control means comprise the application of a voltage between N and P terminals of the PIN structure.

16. A device as claimed in claim 15, characterized in that the bias means comprises a resistance in series with a continuous voltage supply disposed between the N and P terminals.

17. A device as claimed in claim 14, characterized in that the control means comprises means for applying a bias through a current supply.

18. A device as claimed in claim 17, characterized in that said means for applying a bias comprises a diode.

19. A device as claimed in claim 18, characterized in that said means for applying a bias comprises a photodetector diode.

20. A device as claimed in claim 19, characterized in that the photodetector diode is realised on a surface of the vertical structure.

21. A device as claimed in claim 1, 2 or 3, characterized in that the materials for making the multiple quantum well structure comprise alternate binary and one of ternary and quaternary layers of materials of the III-V group.

22. A device as claimed in claim 21, characterized in that the layers other than the MQW structures are one of ternary and quaternary.

23. A device as claimed in claim 22, characterized in that the binary materials are formed by gallium arsenide (GaAs) and the ternary materials are formed by gallium-aluminum arsenide (GaAlAs), while the substrate is of gallium arsenide (GaAs).

24. A device as claimed in claim 23, characterized in that the aluminum (Al) concentration of the compound of arsenic with gallium and aluminium in the MQW, is 0.3, in that in the other waveguide, the aluminum (Al) concentration is 0.11, while the aluminum (Al) concentration in the other layers is 0.16.

25. A device as claimed in claim 24, characterized in that the thickness of the waveguides for obtaining the propagation of a single-mode wave is 0.6 $\mu$m.

26. A device as claimed in claim 24, characterized in that, for operation at about a wavelength of 865 nm, the thickness of the separating layer is D=1 $\mu$m and the coupling length of the light waveguides in the case of a single MQW waveguide is L=288 $\mu$m.

27. A device as claimed in claim 22, characterized in that the binary materials are indium phosphide (InP), the ternary materials gallium-indium arsenide (GaInAs), and the quaternary materials are a compound of arsenic, indium, phosphorus, gallium, while the substrate is of indium phosphide (InP).

* * * * *